60-397. OR RE17,657 EX
May 6, 1930. W. R. BAMFORD ET AL Re. 17,657
VACUUM SYSTEM FOR INTERNAL COMBUSTION ENGINES
Original Filed Feb. 21, 1917
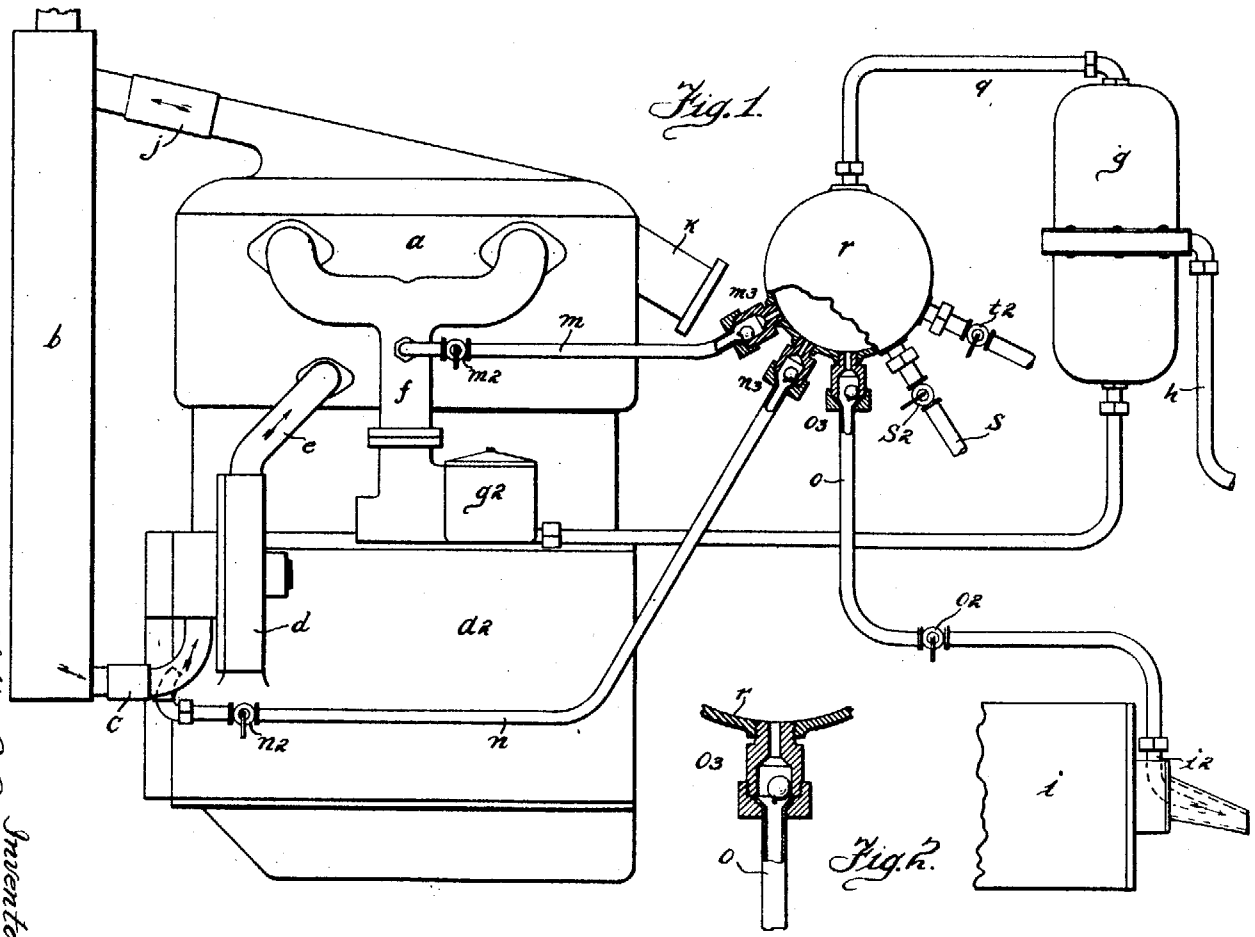
Inventors.
Walter R. Bamford and
Harry W. Hamilton, Deceased.
Curtis B. Camp Trustee, Assignee.
By Williams, Bradbury,
McCaleb & Hinkle
Attorneys.

POWER PLANTS

Examine

Reissued May 6, 1930

Re. 17,657

UNITED STATES PATENT OFFICE

WALTER R. BAMFORD, OF DETROIT, AND HARRY W. HAMILTON, DECEASED, LATE OF DETROIT, MICHIGAN, BY CURTIS B. CAMP, OF OAK PARK, ILLINOIS, TRUSTEE AND ASSIGNEE; SAID BAMFORD AND SAID HAMILTON ASSIGNORS, BY MESNE ASSIGNMENTS, TO CURTIS B. CAMP, OF OAK PARK, ILLINOIS, TRUSTEE

VACUUM SYSTEM FOR INTERNAL-COMBUSTION ENGINES

Original No. 1,244,686, dated October 30, 1917, Serial No. 150,079, filed February 21, 1917. Application for reissue filed July 21, 1927. Serial No. 207,556.

Our invention relates to vacuum systems for internal combustion engines and a primary object of our improvements is to provide an improved vacuum feed system for the liquid fuel and one which shall be reliable under different conditions of operation of the engine; though other applications of our invention may be readily made.

We secure this object in the device illustrated in the accompanying drawings in which:

Figure 1 is an elevation, partly diagrammatic, of an apparatus embodying our invention.

Figure 2 is a detail sectional view of a part of said apparatus.

$a^2$ indicates an internal combustion engine and $a$ is the water jacket around the upper ends of the cylinders thereof. $b$ is the radiator and $j$ is a pipe connecting the water jacket $a$ with the interior of the radiator $b$. $c$ is a pipe leading from the radiator $b$ and connecting with a pump $d$ which in this case is indicated as a centrifugal pump. $e$ is a pipe or passage by which the water passes from the casing of the pump $d$ to the water jacket $a$. $f$ is the intake passage to the engine and $g^2$ indicates a carburetor connected with said intake passage. $g$ represents an auxiliary reservoir placed in an elevated position and adapted to have the fuel drawn thereinto through the pipe $h$ from a supply reservoir (not shown) by a vacuum, as in vacuum feed systems. $k$ is the exhaust pipe and $i$ the muffler.

$r$ is an enclosed chamber which may conveniently be of cylindrical form. The chamber $r$ communicates with the vacuum chamber of the reservoir $g$ by a pipe $q$.

$m$ is a pipe forming a connection between the chamber $r$ and the intake passage $f$. $m^2$ is a cock in the pipe $m$ for regulating the area of the passage therethrough.

$n$ is a pipe forming a connection between the chamber $r$ and the pipe $c$ from which pipe the water is drawn by the pump $d$ in producing the circulation in the cooling system. $n^2$ is a cock for regulating the area through the pipe $n$.

$o$ is a pipe connecting the chamber $r$ with a portion of the exhaust passage from the engine at which a vacuum will be drawn by the action of the passing gases, as for instance at $i^2$. $o^2$ is a cock for regulating the area of the passage through the pipe $o$.

$m^3$ $n^3$ and $o^3$ are, respectively, ball valves in the pipes $m$ $n$ and $o$ adapted to be automatically closed when there is a sufficient draft toward the chamber $r$ in any one of said pipes.

The liquid fuel may be fed to the elevated reservoir $g$ by the suction of the engine acting through the pipe $m$, the chamber $r$, and pipe $q$, as in the usual vacuum feed system, actuated by the vacuum produced in the intake pipe of the engine. This vacuum is sometimes ineffective, as for instance, when the engine is running with a wide open throttle and the engine is usually at this time running at a high rate of speed.

When the engine is running at a considerable speed the pump $d$ actuated by the engine will be drawing a considerable vacuum in the pipe $c$ and consequently in the pipe $n$ which will act to produce the require vacuum in the vacuum chamber of the reservoir $g$ and elevate the fuel and this will be in most favorable operating condition when the action from the intake pipe is apt to fail.

The action of the gases driven with great velocity through the exhaust passage and from the muffler will produce a vacuum in the pipe $o$ which will act to produce a vacuum in the vacuum chamber of the reservoir $g$ and draw the fuel to said reservoir.

Thus there are three sources of vacuum, that is to say, the intake pipe to the engine, the intake pipe leading to the circulating pump, and the exhaust passage. If any one of these sources is considerably stronger than the others the valves $o^3$ $n^3$ or $m^3$ as the case may be in the other passages will be automatically closed.

$t$ and $s$ are auxiliary pipes having, respectively, cocks $t^2$ and $s^2$ therein which may lead to other apparatus than the auxiliary reservoir $g$ to which the pipe $q$ leads to produce an operating vacuum in such apparatus as, for instance, vacuum gear shifting apparatus, or a vacuum brake apparatus.

We have not claimed specifically herein the way of producing the vacuum by the action of the exhaust gases as this forms the subject-matter of an application filed Feb. 26, 1917, Serial Number 150,926.

What we claim is:

1. The combination with a vacuum actuated apparatus of an internal combustion engine having an intake passage and a water circulating system, a circulating pump in said water circulating system actuated by said engine, a passage communicating with said circulating system on the suction side of said pump and with said vacuum actuated apparatus, and a passage communicating with said intake passage and said vacuum actuated apparatus.

2. The combination with a vacuum actuated apparatus of an internal combustion engine having an intake passage and a water circulating system, a circulating pump in said water circulating system actuated by said engine, a passage communicating with said circulating system on the suction side of said pump and with said vacuum actuated apparatus, and a passage communicating with said intake passage and said vacuum actuated apparatus, and automatic means whereby one of said vacuum producing passages is closed when the effect of the other passage predominates.

3. The combination with a vacuum actuated apparatus of an internal combustion engine having an exhaust passage and a water circulating system, a vacuum producing passage communicating with said vacuum actuated apparatus and with said water circulating system at a point in the same where the pressure is less than atmospheric and a vacuum producing passage communicating with said vacuum actuating apparatus and with said exhaust passage at a point where the pressure in the same is less than atmospheric.

4. The combination of a vacuum actuated apparatus, an internal combustion engine having an intake passage and an exhaust passage, a water circulating system, and a vacuum producing passage communicating with said intake passage and said vacuum actuated apparatus, a vacuum producing passage communicating with said vacuum actuated apparatus and said water circulating system at a point where the pressure in the same is less than atmospheric and a vacuum producing passage communicating with said vacuum actuated apparatus and said exhaust passage at a point where the pressure in the same is less than atmospheric.

In witness whereof, I hereunto subscribe my name this 14th day of July, 1927.

WALTER R. BAMFORD.

In witness whereof, I hereunto subscribe my name this 29th day of June, 1927.

CURTIS B. CAMP,

*Trustee and Assignee for Harry W. Hamilton, deceased.*